United States Patent [19]

Weck

[11] Patent Number: 4,523,609
[45] Date of Patent: Jun. 18, 1985

[54] VOLUME FLOW OR PRESSURE REGULATING DEVICE

[75] Inventor: Franz Weck, Wuerselen, Fed. Rep. of Germany

[73] Assignee: H. Krantz GmbH & Co., Aachen, Fed. Rep. of Germany

[21] Appl. No.: 513,039

[22] Filed: Jul. 12, 1983

[30] Foreign Application Priority Data

Jul. 26, 1982 [DE] Fed. Rep. of Germany ....... 3227882

[51] Int. Cl.³ .................... G05D 7/01; F24F 13/10
[52] U.S. Cl. ................ 137/499; 137/505.14; 137/521; 267/36 A
[58] Field of Search ............... 137/499, 521, 505.14; 267/158, 19 R, 36 A; 251/54, 305

[56] References Cited

U.S. PATENT DOCUMENTS

| | | | |
|---|---|---|---|
| 1,607,041 | 11/1926 | Basel | 251/54 |
| 1,776,261 | 9/1930 | Kreissig | 267/20 R |
| 3,315,701 | 4/1967 | Stilwell | 251/54 |
| 3,452,762 | 7/1969 | Fahre | 137/499 |
| 3,538,945 | 11/1970 | Dean, Jr. | 137/499 |
| 3,911,945 | 10/1975 | Dyer et al. | 137/499 |
| 3,965,928 | 6/1976 | Siegwart | 137/499 |

FOREIGN PATENT DOCUMENTS

| | | | |
|---|---|---|---|
| 2617830 | 11/1977 | Fed. Rep. of Germany | 251/305 |
| 2523677 | 9/1983 | France | 267/36 A |

Primary Examiner—Martin P. Schwadron
Assistant Examiner—James R. Shay
Attorney, Agent, or Firm—W. G. Fasse; D. H. Kane, Jr.

[57] ABSTRACT

A volume flow or pressure regulating device is described which is especially suitable for air conditioning or air heating systems. The device transmits a torque moment function onto the flap control shaft in response to the flap angle. The device includes primarily a shaft (2) which is rotatably supported and extends through a conduit (3) in which the flap is mounted on the shaft which cooperates with a curved cam disk (10). One end of a tension cable (9) is secured to a circumferential point of the cam disk and the other end of the tension cable (9) is secured to the free end of a bending spring 6, the opposite end of which is secured to a fixed point. An adjustable tensioning member (7) defines, in accordance with its position relative to the length of the bending spring (6) the effective or bendable length of the bending spring (6). By adjusting the tensioning element (7) either manually or by a motor it is possible to change the air volume flow which is to be maintained constant even if the pressure in the channel upstream of the flap or the differential pressure across the flap changes.

13 Claims, 10 Drawing Figures

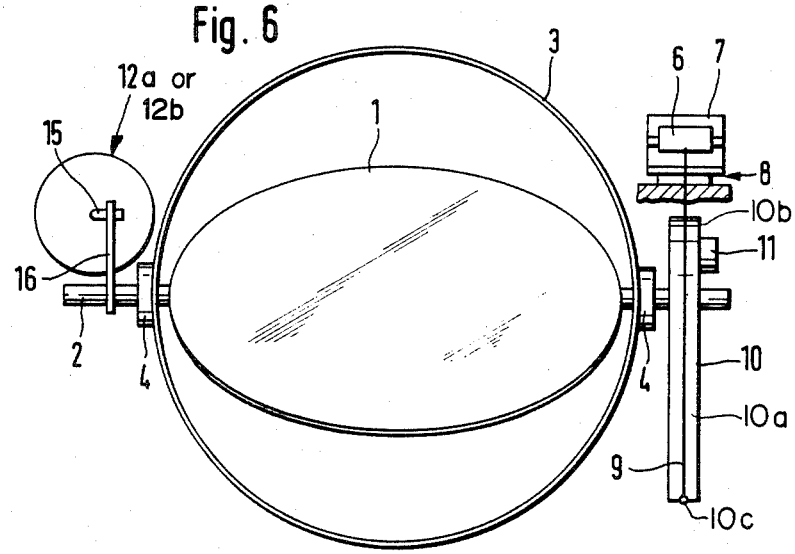
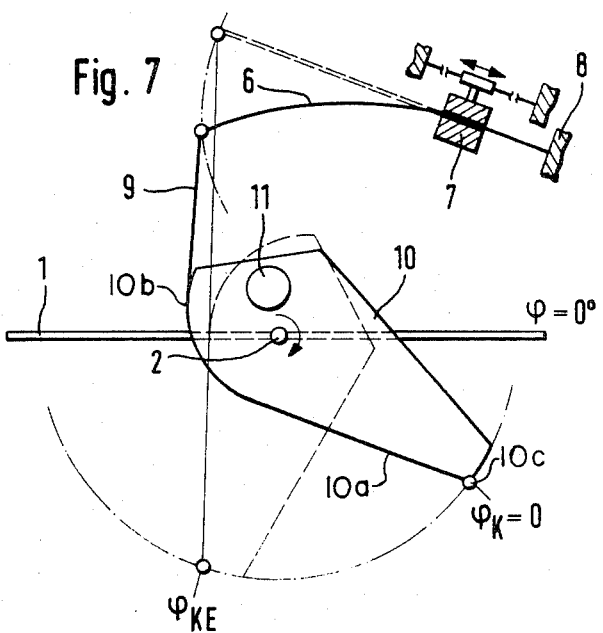

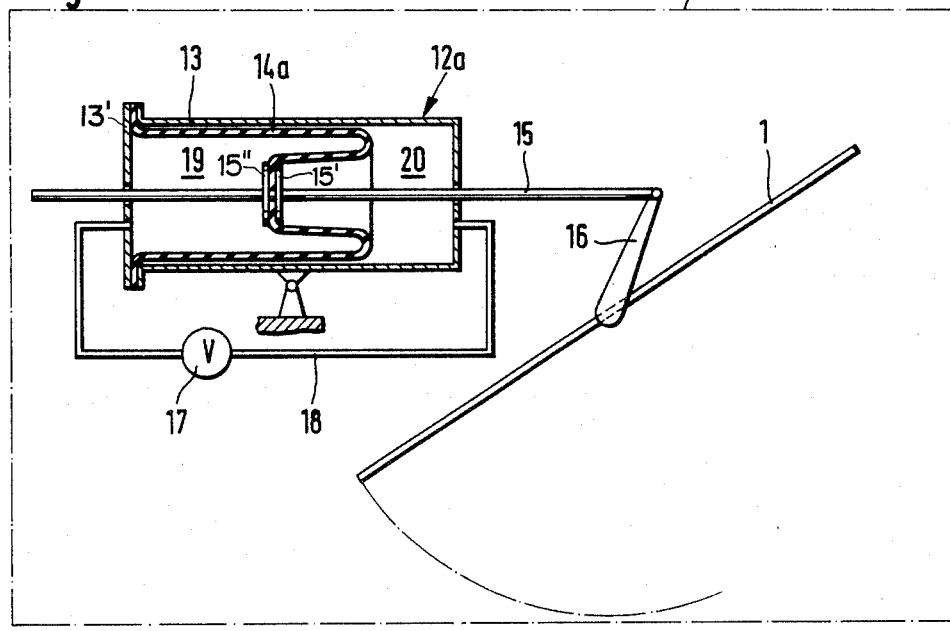
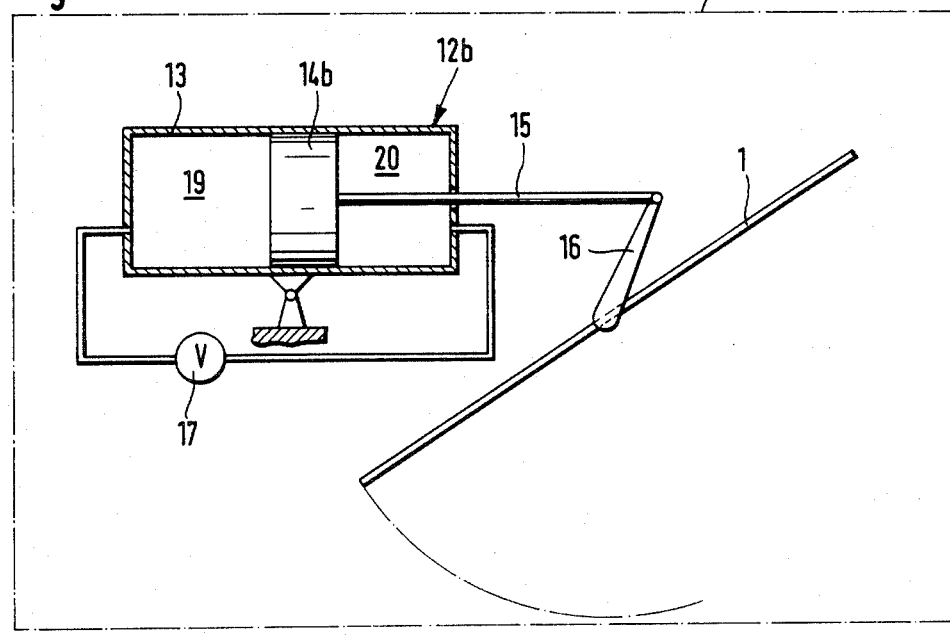

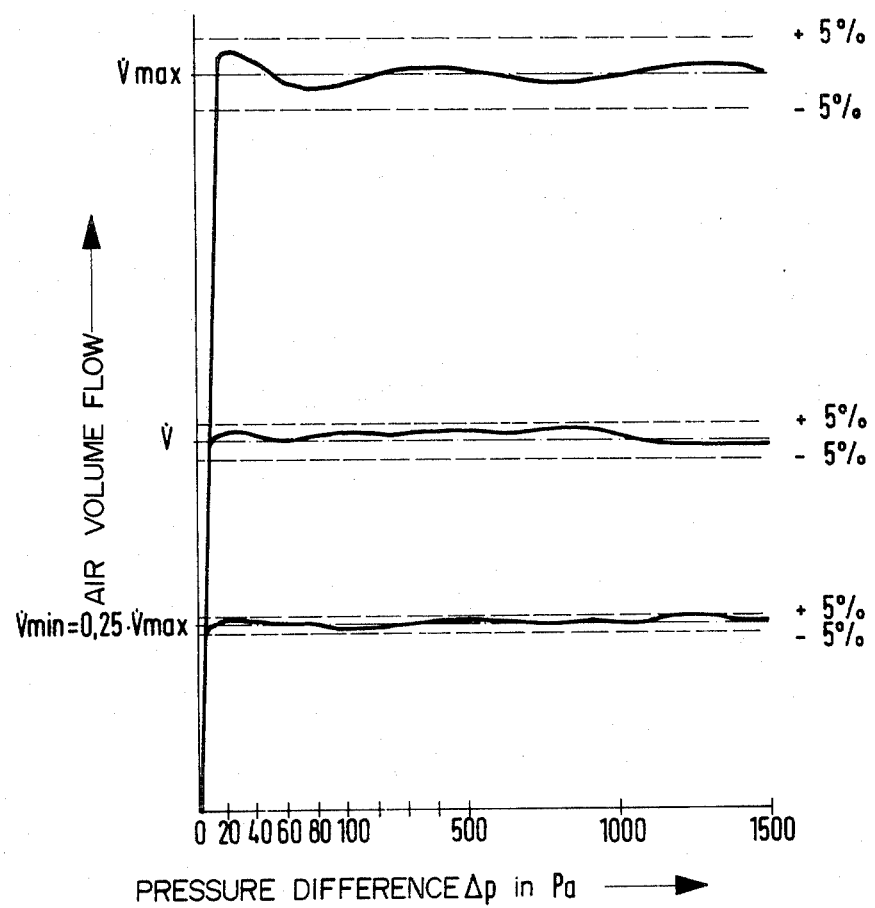

VOLUME FLOW OR PRESSURE REGULATING DEVICE

BACKGROUND OF THE INVENTION

The invention relates to a volume flow or pressure regulating device which is particularly suitable for use in controlling, in a closed loop manner, a flow of gas, especially in air ducts as they are used in air heating and air conditioning systems. Such regulating devices generally comprise a control flap rigidly secured to a shaft which in turn is rotatable by a control member such as a lever or the like.

For maintaining the air flow volume constant, or for maintaining the air pressure constant in a channel or duct it is necessary that the closed loop control transmits a certain torque moment to the flap shaft as a function of or in response to the flap angle. Prior art regulating devices of this type are not sufficiently responsive or sensitive to pressure differentials across the flap. Further, the permissible tolerance range as a proportion of the maximum volume flow leaves room for improvement as does the noise generated by such prior art flaps.

OBJECTS OF THE INVENTION

In view of the above it is the aim of the invention to achieve the following objects singly or in combination:

to provide a volume and/or pressure regulating device which assures, with the aid of simple means, a certain and precise transmission of a torque moment as a function of the flap angle for rotating the flap supporting shaft;

to construct the device in such a manner that flaps of all types and shapes may be employed;

to make the control or regulating device responsive to the flap angle in such a manner that either the pressure upstream of the flap or the differential pressure across the flap is kept constant; and to keep the control deviation from a desired tolerance range as small as possible over a wide range below a rated maximum volume flow.

SUMMARY OF THE INVENTION

The above objectives have been achieved in a volume flow or pressure regulating device according to the invention which comprises on the drive shaft for the flap a cam disk which cooperates with a tension cable. One end of the tension cable is secured to a point on the circumference of the cam disk and the other end of the tension cable is secured to the free end of a bending spring, the other end of which is rigidly secured to a fixed point such as a housing or the like. The arrangement is such, that the length of cable which runs in contact with a circumferential surface portion of the cam disk is variable as a function of the opening angle of the flap.

BRIEF FIGURE DESCRIPTION

In order that the invention may be clearly understood, it will now be described, by way of example, with reference to the accompanying drawings, wherein:

FIG. 6 is a view of the present regulator in the direction of the arrow A in FIG. 4;

FIG. 7 is a view similar to that shown in FIGS. 4 and 5, however, showing a modified version of the present device for the purpose of pressure control or regulation;

FIG. 8 illustrates a vibration damper equipped with a so-called rolling membrane for use in connection with the present volume flow or pressure regulating device;

FIG. 9 illustrates another vibration damper comprising a piston cylinder arrangement for use in combination with the present device; and FIG. 10 shows the operational characteristics of the present device illustrated in the form of the air volume flow as a function of the pressure difference across the regulating flap, and with reference to a rated or required air volume flow.

DETAILED DESCRIPTION OF PREFERRED EXAMPLE EMBODIMENTS AND OF THE BEST MODE OF THE INVENTION

Figure 1:
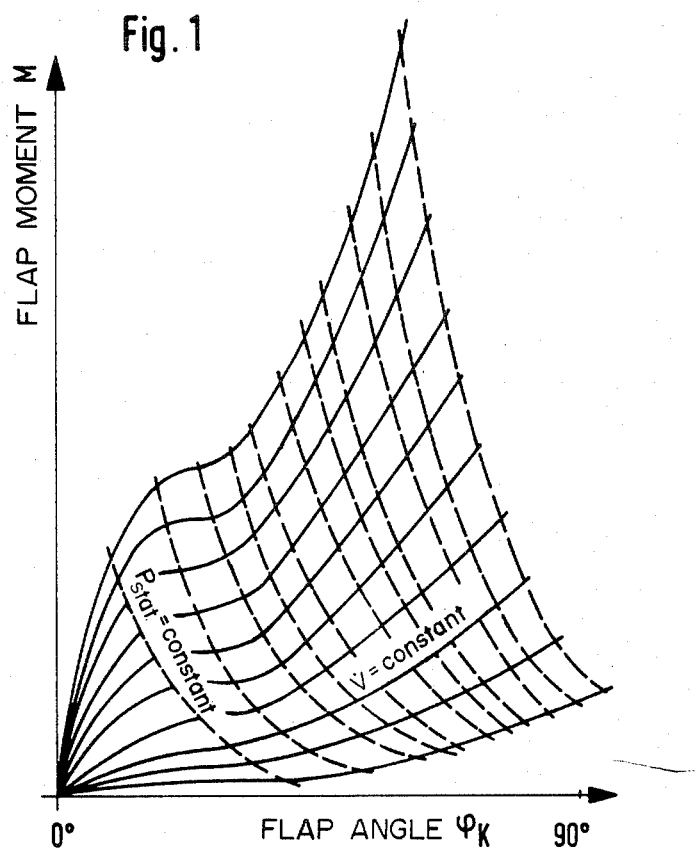
FIG. 1 shows the flap closure torque moment as a function of the flap angle providing information regarding the aerodynamic and static closure torque moment.

FIG. 1 illustrates the typical characteristic curves of the dynamic closure torque moment for operating a centrally supported flap as a function of the flap angle, whereby the full line curves illustrate a constant air volume flow and wherein the dashed line curves illustrate the constant static pressure just upstream of a flap. The parameter V-constant relates to the full line curves and the parameter $p_{stat}$-constant refers to the dashed line curves.

Figure 2:
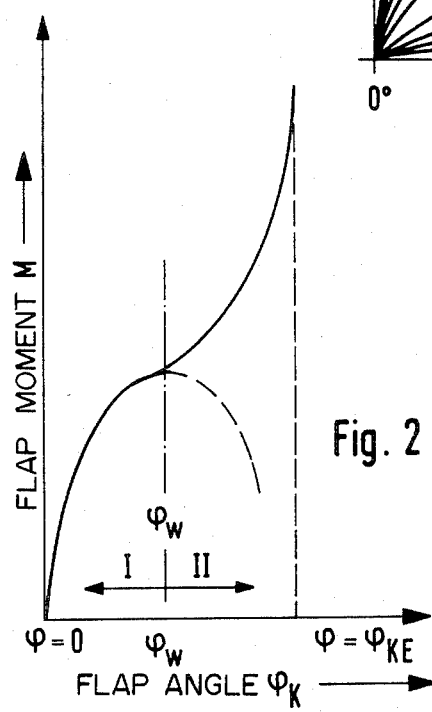
FIG. 2 shows the flap torque moment as a function of the flap angle, whereby the volume flow is a constant parameter.

As is clear from FIG. 2 the constant volume flow curves corresponding to the full line curves in FIG. 1, exhibit a turning point at a flap angle $\phi_w$. As a result, the entire range covered by the angular movement of the flap is divided into two sections, whereby section I covers the angular range of $\phi=0$ to $\phi_w$ while the section II covers the range from $\phi_w$ to $\phi K_E$.

Figure 3:
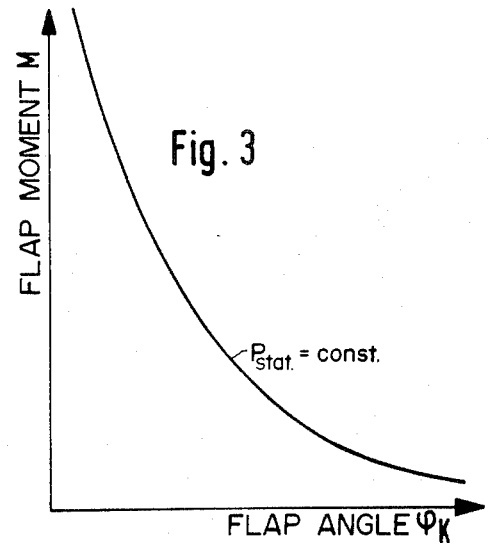
FIG. 3 shows the flap torque moment as a function of the flap angle, whereby the static pressure upstream of the flap is a constant parameter.

FIG. 3 illustrates the flap moment as a function of the flap angle for a specific constant static pressure as a parameter, thus, representing one of the dashed line curves in FIG. 1.

Figure 4:
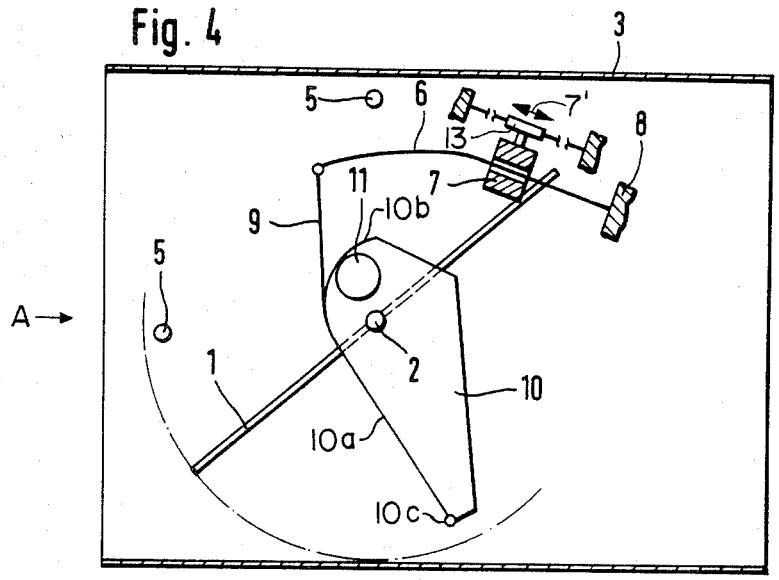
FIG. 4 is a simplified side view of a volume flow regulator according to the invention shown partially in section.
Figure 5:
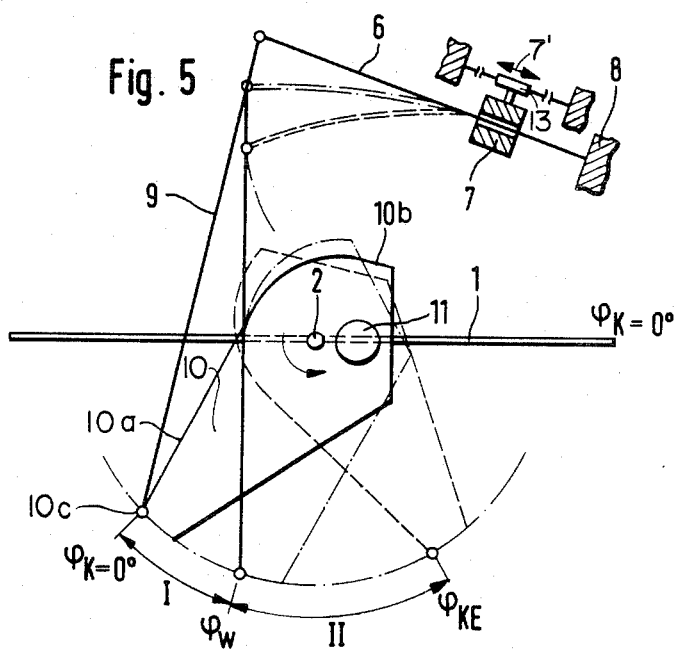
FIG. 5 is a view similar to that of FIG. 4, but showing the components of the volume flow regulator in a different adjustment position for explaining the operation of the invention.

Referring to FIGS. 4, 5 and 6, the illustrated device is constructed according to the invention so as to simulate or reproduce the respective torque moment curve for maintaining the volume flow constant. The device comprises a flap 1 rigidly secured to a shaft 2 extending through the center of the flap and rotatably supported outside the flap by bearings 4 as best seen in FIG. 6. The flap 1 is mounted in a channel or conduit section 3 and turnable through an angle of about 90° so that in the horizontal position of the flap shown in FIG. 5 with the angle $\phi_K=0°$, the cross-sectional flow area of the conduit 3 is substantially completely opened, whereas the cross-sectional flow area is substantially closed when the flap is in the vertical position in which the flap angle relative to the horizontal is 90°. The shaft 4 extends entirely through the conduit 3 inside of which there are arranged stop members 5 which limit the angular range of movemen of the flap 1.

Referring to FIG. 6, the ends of the shaft 2 protrude from the conduit 3 outside of the bearings 4. On the right hand end of the shaft 2 there is arranged a cable crank and cam drive comprising substantially a leaf-spring 6 shaped as a bending spring and cooperating through a tension cable 9 with a curved cam disk 10. One end of the leaf-spring 6 is rigidly secured to the apparatus frame 8, one end of the tension cable 9 is secured to the free end of the bending leaf-spring 6 while the other end of the tension cable 9 is secured to the cam disk 10. Intermediate the ends of the spring 6 there is arranged a tensioning element 7 which is adjustable back and forth along the length of the spring or at least a portion of the length of the spring as indicated by the double arrow 7' in FIG. 4. This adjustment changes the bending length of the leaf spring 6.

The effective length of the tension cable 9 is variable as a function of the angular flap position since the cam disk 10 is rigidly secured to the shaft 2 and since one end of the cable 9 is secured to a point on the circumferential surface of the cam disk 10 so that a portion of the length of the tension cable 9 extends in direct contact with the circumferential surface portion of the cam disk 10. The length of this surface contact between the cable 9 and the cam disk 10 depends on the angular position of the cam disk 10. The free length of the tension cable 9 thus becomes effective at different points along the circumferential surface of the cam disk 10 and thus it becomes effective with a differing lever arm relative to the rotational axis. A counter weight 11 is attached laterally to the cam disk 10 in order to hold the system in balance when no forces are effective. The counter weight or mass 11 may be spaced from the shaft 2 with a variable spacing which as such is conventional, or different weights may be used to make the mass variable.

As further shown in FIG. 6, a pneumatic vibration damper 12 is pivotally connected to the left-hand end of the shaft 2 opposite the respective bearing 4, or rather, adjacent to the respective bearing 4.

FIG. 8 illustrates one embodiment of a vibration damper 12a, whereby the dash-dotted lines show the conduit 3 and the flap 1 so as to illustrate the positional relationship between the vibration damper 12a and the just mentioned components 1 and 3. The vibration damper 12a comprises a cylinder 13 in which a movable means in the form of a rollable or rolling membrane 14a of a flexible material is held in position between a cylinder housing 13 and a cover member 13'. The membrane 14a is centrally connected to a rod 15 extending coaxially through the cylinder housing 13 and clamped to the membrane by two plates 15' and 15''. The right-hand free end of the rod 15 is pivoted to a lever 16 which in turn is rigidly secured to the shaft 2 thereby connecting the vibration damper 12a to the flap 1 for vibration damping. A throttling valve 17 is arranged in a fluid conduit 18 interconnecting the two cylinder chambers 19 and 20 on the left and right-hand side of the membrane 14a. The throttling valve 17 permits an adjustment of the damping intensity.

FIG. 9 illustrates another vibration damper 12b which is constructed similar to that of FIG. 8, except that in FIG. 9 the membrane 14a has been replaced by a piston 14b. The piston 14b again separates the cylinder housing 13 into two chambers 19 and 20 and operates in the same manner as described above with reference to FIG. 8.

Referring to FIG. 5, it will be noted that the tension cable 9 does not rest against the circumferential surface of the curved cam disk 10 in the zone I. Due to the rotation of the flap 1 in response to the pressure in the conduit 3, just upstream of the flap 1 functioning as a volume flow controller or regulator, the tension cable 9 in cooperation with the curved cam disk 10 functions as a crank drive, thereby maintaining the volume flow constant with the aid of the bending spring 6. The required opening torque moment, please see FIG. 1, of the flap 1 follows the curve of zone I in FIG. 2. When the turning point between the two zones is reached, the tension cable 9 starts contacting the circumferential surface of the cam disk 10, thereby forming the crank drive. Thus, following the turning point, the closing torque moment follows the curve in the zone 2 as a function of the pressure change in the channel just upstream of the volume flow controller flap 1 and as a function of a corresponding change in the flap angle $\phi$. The air volume flow, however, remains constant in spite of the pressure change in the channel 3.

By adjusting the position of the tensioning element 7 relative to the length of the spring 6, it is possible to vary the air volume flow quantity which needs to be kept constant in spite of a pressure change in the conduit 3. As shown in FIG. 1 adjustment of the tensioning element 7 provides a shift between the full line curves representing the constant volume curves.

The characteristic curve of the flap torque moment for achieving a constant pressure just upstream of the flap 1, is shown in FIGS. 1 and 3, whereby the illustration in FIG. 1 refers to the dashed line curves.

The adjustment of the tensioning element 7 may be done manually for maintaining a certain air volume flow constant in so-called constant volume flow systems. In the alternative, it is possible to adjust the tensioning element 7 automatically by means of an adjustment motor in order to maintain the air volume flow constant at different constant values relating to different points of time independently of the pressure inside the conduit 3. This latter automatic adjustment is applied primarily in so-called variable volume flow systems.

FIG. 10 illustrates the tolerance range within which a system according to the invention may be maintained, even down to an operating condition in which the minimum volume flow is only 25% of the maximum volume flow. It is an important advantage of the control according to the invention that the air volume flow may be maintained constant within a $\pm 5\%$ range relative to an adjusted average or mean value of the differential pressures across the flap 1 within a range of 20 Pa and about 1500 Pa. This narrow tolerance is maintained in a volume flow range of 25% to 100% of the maximum volume flow.

Another advantage of the invention is seen in that it may be employed in connection with flaps having different geometrical shapes, for example round flaps, rectangular flaps, oval flaps or similarly shaped flaps may be employed. Further, the flap itself may be plane or it may form a curved plane in space. The shaft 2 may extend through the center of the flap or it may be attached off-center. Further, it is possible that the flaps take up any desired angle in their closed condition relative to the longitudinal axis of the conduit 3. In connection with the application of the present apparatus for maintaining the pressure constant, it is possible to maintain the pressure just upstream of the flap constant or to maintain the differential pressure across the flap constant.

Heretofore, volume flow controllers required a minimum pressure range of 100 to 200 Pa. Contrary thereto, the controller according to the invention is fully operational even at minimal pressure differences of 20 Pa which results in substantial savings and has the added advantage that the control device produces very little noise. The present invention also compares favorably with prior art controllers in which the tolerance range of ±5% relative to a rated volume flow value can be maintained only in a range of 50 to 100% of the maximum volume flow, whereas the invention is capable of maintaining such tolerances at a volume flow as low as 25% of the maximum volume flow.

Incidentally, the embodiment of FIG. 7 is constructed substantially in the same say as the embodiment of FIGS. 4, 5 and 6. The embodiment of FIG. 7 is especially suitable for a closed loop pressure control. The difference between the two versions is that the control direction in FIG. 7 is opposite to the control direction in FIG. 5 as indicated by the clockwise and counterclockwise arrows respectively in FIGS. 5 and 7.

The cam disk 10 shown in FIGS. 4 to 7 has a cam surface with at least one straight section 10a and a curved section 10b merging into the straight section 10a. The cable 9 is connected to such a point 10c of the surface of the cam 10 that, depending on the rotational position of the cam 10, a variable portion of the length of the cable 10 may rest against the respective portion of the cam surface. Preferably, the point 10c on the cam surface to which one end of the pulling cable 9 is connected, is located on the straight section 10a remote from the curved section 10b. The curved section 10b follows the straight section 10a as viewed in the rotational direction of opening the flap 1. In the position shown in FIG. 4 the straight section 10a extends substantially perpendicularly to the plane of the flap 1. In the position shown in FIG. 5 the straight section 10a extends at an angle, preferably an acute angle, relative to the plane of the flap 1. The curved section 10b is a portion of a circular arc covering about 90°.

Although the invention has been described with reference to specific example embodiments, it will be appreciated, that it is intended to cover all modifications and equivalents within the scope of the appended claims.

What is claimed is:

1. A volume flow or pressure regulating device for installation in a flow channel, comprising a shaft extending through said channel, bearing means rotatably supporting said shaft, control flap means rigidly secured to said shaft for rotation with the shaft in said channel, cam means rigidly secured to said shaft, said cam means having a cam surface, a tension or pulling cable, bending spring means including a leaf spring having one end secured to a fixed point having a variable position, said pulling cable being secured with one end thereof to a point on said cam surface, said pulling cable being secured with its other end to a free end of said bending spring means, said pulling cable, said bending spring means, and said cam surface being located relative to each other so that a variable portion of the length of the cable rests against and along the cam surface in response to the angular position of said flap means for maintaining a controlled flow condition and adjusting means (7) forming said fixed point shiftably connected to said leaf spring and including means for shifting said fixed point along said leaf spring for adjusting an effective length of said bending leaf spring for providing a two branch torque moment characteristic.

2. The device of claim 1, wherein said cam surface along which said variable portion of the length of the cable may rest, comprises at least one straight section and a curved section merging into said straight section, said curved section following said straight section in the rotational direction of opening said flap means.

3. The device of claim 2, wherein said straight section extends perpendicularly to the plane of said flap means, and wherein said curved section is a portion of a circular arc extending over an angular range of about 90°.

4. The device of claim 2, wherein said straight section extends at an angle relative to the plane of said flap means and wherein said curved section is a portion of a circular arc extending over an angular range of about 90°.

5. The device of claim 4, wherein said angle is an acute angle.

6. The device of claim 2, wherein said point on the cam surface to which said one end of said pulling cable is secured, is located on said straight section of said cam surface remote from said curved section.

7. The device of claim 1, further comprising a balancing mass operatively forming part of said cam means for holding the device in a determined position in the absence of forces otherwise effective on the device.

8. The device of claim 7, wherein said balancing mass has a certain variable spacing from said shaft.

9. The device of claim 7, wherein said balancing means has a variable mass.

10. The device of claim 1, further comprising lever means operatively secured to said shaft for rotating said shaft, and damping means operatively connected to said lever means for vibration damping.

11. The device of claim 10, wherein said vibration damping means comprise a cylinder, movable means in said cylinder, rod means connected to said movable means in said cylinder and extending out of said cylinder, said rod means being connected to said lever means.

12. The device of claim 11, wherein said movable means comprise a rolling flexible membrane connected to said rod means and dividing said cylinder into two chambers, fluid conduit means operatively interconnecting said chambers, and throttling means in said fluid conduit means for adjusting the damping intensity or effect of said damping means.

13. The device of claim 11, wherein said movable means comprise a piston connected to said rod means and dividing said cylinder into two chambers, fluid conduit means operatively interconnecting said chambers, and throttling means in said fluid conduit means for adjusting the damping intensity or effect of said damping means.

* * * * *